United States Patent
Thurston

[15] 3,638,887
[45] Feb. 1, 1972

[54] AIRPLANE RETRACTABLE LANDING GEAR

[72] Inventor: David B. Thurston, Springvale, Maine

[73] Assignee: Thurston Aircraft Corporation, Sanford, Maine

[22] Filed: Oct. 21, 1969

[21] Appl. No.: 867,998

[52] U.S. Cl. ...................................................244/102 SL
[51] Int. Cl. ............................................................B64c 25/14
[58] Field of Search................244/101, 102, 103, 104, 100; 267/57; 280/124.3

[56] References Cited

UNITED STATES PATENTS

| | | | |
|---|---|---|---|
| 1,442,155 | 1/1923 | Klemin | 244/101 |
| 1,921,992 | 8/1933 | Loening | 244/101 |
| 2,196,946 | 4/1940 | Stone | 244/101 |
| 2,668,030 | 2/1954 | Smith et al. | 244/102 SL |
| 2,893,661 | 7/1959 | Aylor | 244/103 X |

Primary Examiner—Milton Buchler
Assistant Examiner—Paul E. Sauberer
Attorney—Eliot S. Gerber

[57] ABSTRACT

The main landing gear for an airplane includes a pair of retractable wheels. The wheels are retracted by hand operation of a lever. The landing gear mechanism also includes a pair of air cylinders and a release device which is operated to release the cylinders when the wheels are lowered in water.

8 Claims, 5 Drawing Figures

AIRPLANE RETRACTABLE LANDING GEAR

DESCRIPTION

The present invention relates to the landing gear of airplanes and more particularly to a retractable landing gear for amphibian airplanes.

The landing gear of an airplane consists of the main wheels, usually two, which are mounted on one or more axles by struts below the fuselage of the aircraft. In addition, a tail wheel or nose wheel is required for stability and proper attitude on the ground. Ever since the infancy of airplane manufacture, it has been recognized that it would often be desirable if the landing gear could be retractable, under control of the pilot. The landing gear should be lifted upward during normal flight and lowered for landings on runways. In the case of amphibian seaplanes using their hulls to land on water, the main landing gear must be retracted to permit the airplane to land on its hull in the water. The wheels of the landing gear are lowered for landings on runways. In the case of land-based planes, a retractable landing gear is preferred as it decreases wind drag, enabling the plane to use less fuel and fly faster.

In large planes the main landing gear is operated by a heavy, complex and costly hydraulic system, including hydraulic pumps, lines and pistons. Due to its weight and cost, that type of hydraulic system may not be feasible for use on light planes; for example, two-, three- or four-passenger single-engine aircraft. The use of various types of unassisted mechanical retraction systems has been proposed. However, such systems may require considerable strength and exertion for their operation.

The problem of designing a suitable nonhydraulic retractable landing gear is particularly serious in the case of seaplanes of the amphibian hullplane type. In such planes the tires of the main landing gear may be of the low-pressure type, so that they may take off and land on relatively rough runways. When the seaplane is resting in the water, it may be desired to lower the landing gear, for example, to taxi the seapiane from the water and up a ramp and onto land. The tires must be pushed into the water, which is difficult due to the buoyancy of the tires. In a sense, the landing gear must lift the entire plane against the buoyancy of the tires. The landing gear must be able to be operated by women pilots even when the gear is lowered in water. In addition, it is a safety requirement of the Federal Aviation Administration that the landing gear must be able to be lowered by purely mechanical means in the event of failure of the regular landing gear system.

It is the objective of the present invention to provide a hand-operated retractable landing gear system for light airplanes.

It is a further objective of the present invention to provide such a landing gear system which may lower the wheels of a hullplane type of seaplane while it is in the water.

It is a further objective of the present invention to provide such a system which is not hydraulic in operation and which is relatively simple, low in weight and inexpensive.

In accordance with the present invention, a retractable landing gear is provided which includes a lever within the airplane cabin. The lever is pivotally connected to a base plate attached to the fuselage. A button on the lever unlocks it for movement about its pivot. The movement of air over the landing gear, and particularly over its wheels, aids in the upward retraction of the landing gear. The lever is connected so that its upward movement brings up the wheels. The upward motion of the wheels, aided by the airflow over them, is also aided by a pair of compressed air cylinders. The pistons of the cylinders are connected to rings secured to a torsion tube. The torsion tube supports the struts to which the wheels are connected.

Other objectives of the present invention will be apparent from the following description of the inventor's best embodiment, taken in conjunction with the accompanying drawings, in which:

FIG. 4 is an enlarged view of a portion of the mechanism shown in FIG. 2; and

FIG. 5 is a detail of the locking means of the present invention.

Figure 1:
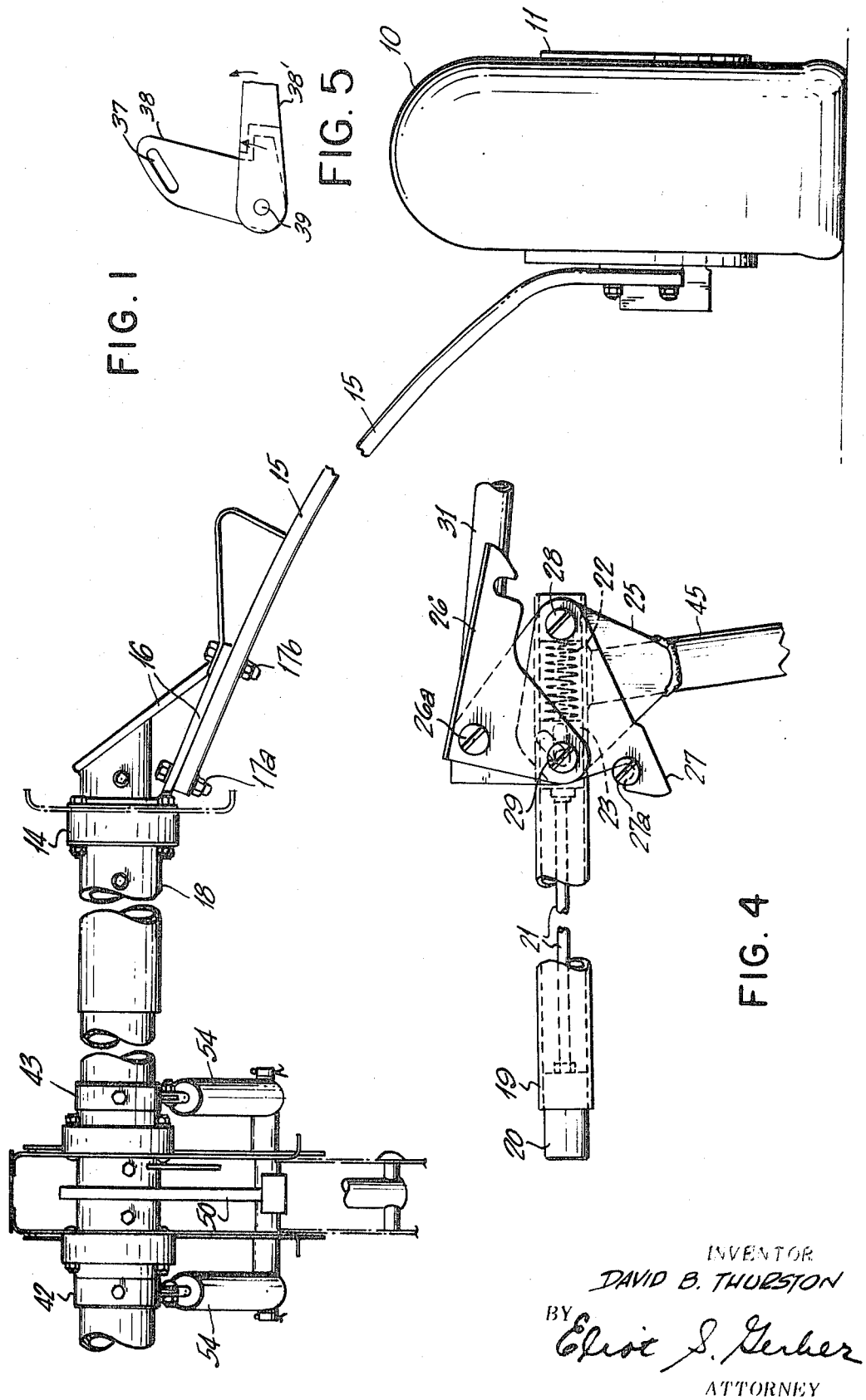
FIG. 1 is a front view of a portion of the landing gear of the present invention.

As shown in FIG. 1, the retractable main landing gear of the present invention utilizes low-pressure tires 10 which are mounted on wheel and brake drums 11. The drums are free to rotate on an axle which is fixed to the front wheel strut 15. Only one wheel and its supporting wheel strut is shown in FIG. 1, but it will be understood that the main landing gear utilizes two such wheel struts and wheels. The entire mechanism is symmetrical about a centerline through the center of the fuselage. The wheel strut 15, for simplicity of illustration, is shown as being cut off. However, it will be understood that the wheel strut is of sufficient length so that, when lowered, it will support the airplane.

The top of the wheel strut 15 is fixed to a support plate 16 by bolts 17a and 17b. The support plate 16 is welded or otherwise fixed to a strong metal torque tube 18. The torque tube 18, when the landing gear is lowered, is in a position to communicate any forces on the landing gear to the fuselage of the plane. However, the torque tube 18 may also be rotated within its sleeve 14, the sleeve 14 being fixed to the fuselage.

Figure 2:
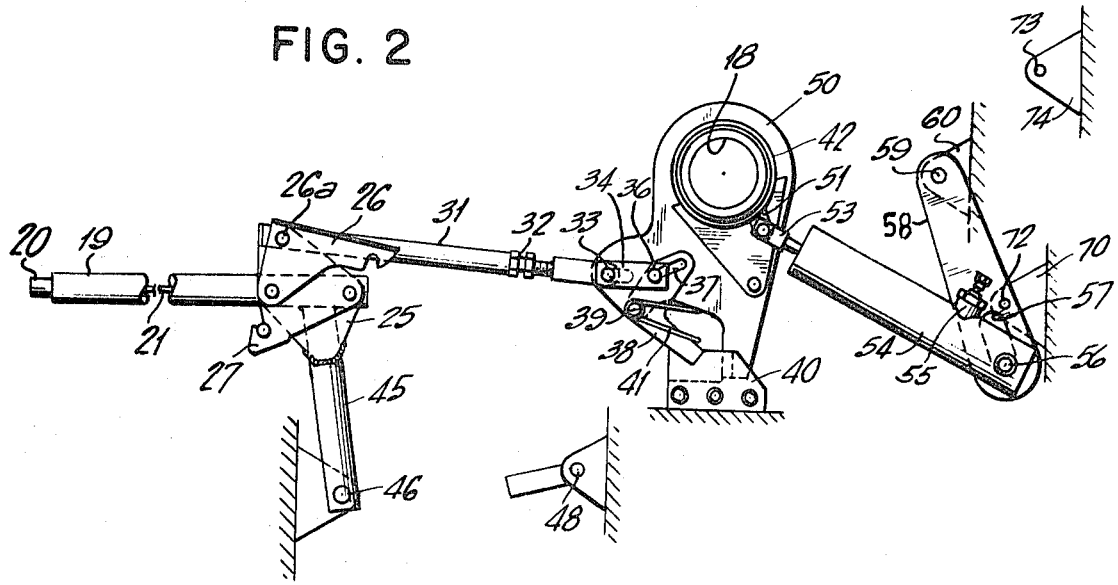
FIG. 2 is a side plan view of the landing gear retraction mechanism with the landing gear down.
Figure 3:
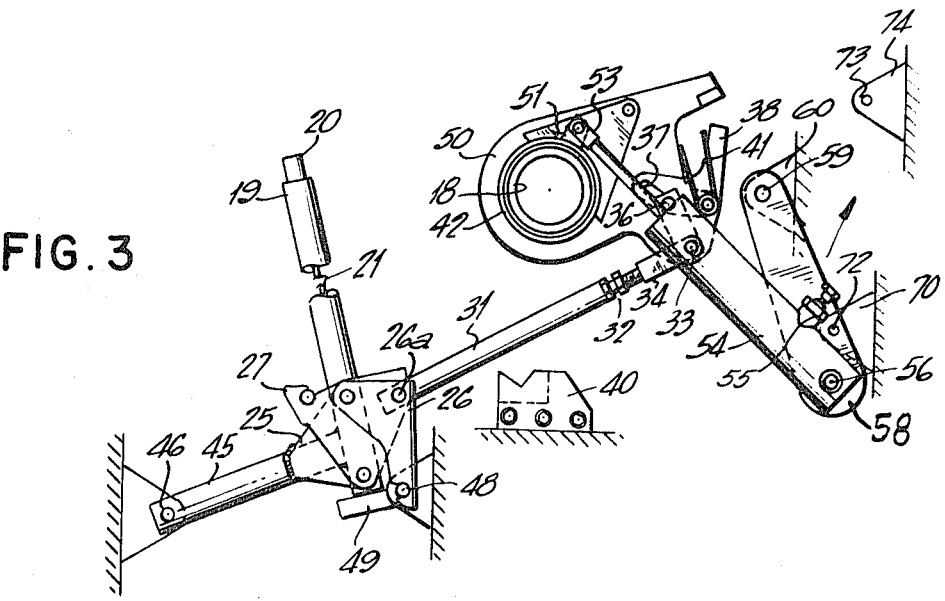
FIG. 3 is a side view similar to FIG. 2 but with the landing gear up.

The retracting mechanism for the landing gear of the present invention is shown in FIGS. 2–4. That mechanism includes a lever 19 which is a tubular member. A button 20, positioned at the upper free end of the lever 19, is connected to a rod 21 within the tube of the lever 19. The button acts against the push-rod 21 in order to release the lever for upward motion. The push-rod is held normally outward by means of the compression spring 22 acting against a pistonlike member 23 attached to the rear end of the push-rod 21 (see FIG. 4). The lever 19 is fixedly connected to a connecting plate 25 at two positions 28 and 29. A top locking latch 26 is pivoted on connecting plate 25 by pivot means 26a. A second locking latch 27 pivots on pivot 28 and catches on the pin 27a (fixed to the frame or fuselage) to lock the landing gear down.

When button 20 is pushed, it acts through rod 21 to move pistonlike member (plunger) 23 which carries bolt 29. Bolt 29 slides in a slot in tube lever 19 and moves latches 26 and 27. For example, bolt 29 acts on an enlarged bolt hole in latch 26 and on slots in latch 27. FIG. 4 thus shows how latch 27 releases lever 19 from the locked-down position when button 20 is depressed.

An arm 45, near its lower end, is pivotally connected to the frame or fuselage by pivot 46 (see FIGS. 2 and 3). Pivot 46 is the fixed pivot for the entire lever system. Arm 45, near its top, has plate 25 attached to it by welding or bolting. As shown in FIG. 2, when the lever 19 is in its locked horizontal position with the wheels (landing gear) down, the arm 45 is about vertical. As shown in FIG. 3, when the lever 19 is raised clockwise until an almost vertical position, raising the wheels, the arm 45 moves clockwise until it is almost horizontal. The nose of plate 25 and base of 19 stop such clockwise motion of arm 45 when that nose and base come to rest against stop block 49, which is fastened to the fuselage (see FIG. 3). In that position the top latch 26 catches fixed pin 48 locking the landing gear up. The nose of plate 25, near pivot 28, passes over the imaginary line between pivots 46 and 33 when it locks against stop block 49, and so tends not to be unlocked by pressure between those points.

A connecting rod 31 is pivotally attached at pivot 26a at the forward end of rod 31 to the connecting plate 25. The connecting rod 31, at its rear end, is connected by an adjustable mechanism 32 to a pivot connection 33. The pivot connection 33 is on one end of a connecting link 34. The link 34, at its rear end, has a second pivot pin 36 which fits within a slot 37 in a locking member 38.

A second locking member 38' pivots about pivot means 39. The rear face of the extending arm of the locking member 38' normally fits within a cutout in a locking block 40, which block is fixed to the fuselage or frame. The normal position of the locking member 38' is maintained by the bias spring 41.

Member 38' is free to move up independently of member 38. For example, a nose of member 38 may fit in a cavity of 38' to push it upwardly and yet permit the free downward movement of member 38', as shown in FIG. 5.

A large connecting plate 50 is fixed to the torsion tube 18. Two rings 42,43 are also fixed to torsion tube 18. Each ring 42 has a flange 51 having a hole through which a pivot pin extends. The pivot pin pivotally connects the flange 51 to the end of a rod 53 attached to the piston of an air cylinder 54. The air cylinder 54 has a charging valve 55 and a pivotable connecting pin 56 at its opposite end.

The air cylinder is charged with 200–300 pounds of air which it retains under pressure. Only in the event of leakage or failure of the piston need it be recharged with high-pressure air. The piston acts like a compression spring. It is put under slight compression and then expands during the retraction of the landing gear, aiding in retraction of the gear. Such action is aided by the airflow over the wheels of the landing gear. Subsequently, when the landing gear is lowered, the compression of the air within the air cylinders and the airflow over the wheels of the landing gear aid in lowering the wheels with minimum pilot effort or impact force.

The piston attached to rod 53 extends during retraction (FIG. 3) compared to its position with the landing gear lowered (FIG. 2). During retraction, when the action of manual retraction has moved rod end 53 counterclockwise past dead center (FIG. 2), the energy stored in the compressed air cylinder 54 is permitted to exert force on the piston and so help raise the gear. The flow of air over the extended landing gear aids in initial retraction due to the aerodynamic drag force acting on wheels 10 located some distance below tube 18. This drag force acts in an aft direction which assists in retracting the gear.

The rear end pivot pin 56 of the cylinder is positioned within a slot in an arm 58 (see FIG. 2). The upper end of the arm 58 pivots on pivot 59 fixed to the frame or fuselage member. The arm 58 is removably pinned to the frame member 60 by release pin 72. When the wheels are to be lowered (if the plane is on the water), it is first necessary to disconnect the release pin 72 which may, for example, be a spring-loaded pin. The removal of the release pin 72, which fits within a hole in the arm 58, allows the arm 58 to swing backwards, i.e., counterclockwise, as shown by the arrow in FIG. 3. This changes (raises) the pivot position of the rear end of the air cylinders and enables them to aid, rather than resist, the lowering of the landing gear. The arm 58 may then be locked in its raised position, out of the way, by placing a releasable pin through the hole 73, which is in a frame member 74. The locking of the arm in its raised position, to frame member 74, enables the landing gear to be lowered and raised a number of times while the airplane is in the water, without changing the position of the arm 58. The counterclockwise movement of the arm 58, when the landing gear is up as in FIG. 3, ensures that the air pistons do not apply a resisting force on the rings of the torsion member when the wheels are lowered when the plane is in water. When the wheels are retracted (the landing gear is up), as shown in FIG. 3, the arm can be moved clockwise to its normal position and the lower releasable pin 72 replaced in its hole in the arm 58 to permit normal lowering of the landing gear for land operation.

In an alternative embodiment, the second releasable pin position 73 may be omitted and the arm 58 permitted to swing free after the releasable pin 72 is removed from the arm.

In operation, arm 58 is unlocked at pin 72, raised, and locked at hole 73 all by manual action of the operator. Rod 53 is thereby relaxed and rod 31 prevents rotation of tube 18. In their new position (locked at 73), the air cylinders come into action when up lock latch 26 releases from pin 48 due to button 20 action and flange 51 rotates clockwise (FIG. 3) to pass over dead center to compress cylinders 54 and so receive a downward force from the cylinders 54 and 51 acting along a line from 73 to flange 51. This adds a positive downward force to the system to assist in displacing (lowering) the wheels in water (the tires are buoyant). The arm 58 is always moved counterclockwise from down to up (72 to 73), as shown in FIGS. 2 and 3.

I claim:

1. An airplane retractable landing gear for an airplane having a fuselage, said landing gear comprising a strut adapted to carry a rotatable wheel, a torsion member fixed to said strut, bearing means fixed to said fuselage and rotatably mounted said torsion member, a compressed air cylinder having a piston acting against an enclosed volume of air, said cylinder being connected to said torsion member and to said fuselage by connecting means, said cylinder being operable so that the compressed air within the cylinder acts through the piston to assist in retraction motion of the torsion member in one direction and the piston acts upon the compressed air to reduce lowering impact forces in the opposite direction of movement of the torsion member, a manually operated lever and linkage system connected to said torsion member and pivotally mounted on said fuselage, said lever system rotating said torsion member upon its being operated, and means to lock said lever system in a first position corresponding to the wheels being down and in a second position corresponding to the wheels being raised.

2. A retractable landing gear as in claim 1 for use in water and on land wherein the means connecting the cylinder to the fuselage is operable to free the cylinder from the fuselage and enables the wheels to be lowered in water.

3. A retractable landing gear as in claim 1 for use in water and on land wherein the means connecting the cylinder to the fuselage is operable to removably and temporarily connect the fuselage to the cylinder at a first position on the fuselage when the landing gear is retracted and also operable to removably and temporarily connect the fuselage to the cylinder at a second position on the fuselage when the landing gear is lowered in water.

4. A retractable landing gear as in claim 3 wherein the piston of the cylinder is pivotally connected to said torsion member, the cylinder is pivotally connected to an arm, and removable pin means temporarily connects the said arm to the fuselage in the two said positions.

5. A retractable landing gear as in claim 1 wherein the lever and linkage system includes a first lever having a release mechanism to release said locking means, a connecting plate fixedly connected near one end of said first lever, an arm fixedly connected to said connecting plate and also pivotally connected to said fuselage, and a connecting rod pivotally connected to said connecting plate and also pivotally connected to said torsion member.

6. A retractable landing gear as in claim 1 wherein said torsion member is a torsion tube.

7. A retractable landing gear as in claim 6 wherein the strut comprises a left strut and a right strut, each of which struts carries a freely rotatable wheel drum upon which is mounted a tire, and the struts near their top portions are removably fixed to said torsion tube.

8. A retractable landing gear as in claim 6 wherein a pair of air cylinders are positioned between the torsion member and the fuselage.

* * * * *